(12) United States Patent
Tanaka (10) Patent No.: US 6,170,625 B1
(45) Date of Patent: *Jan. 9, 2001

(54) PULLEY UNIT (75) Inventor: Yasuhito Tanaka, Nara (JP)

(73) Assignee: Koyo Seiko Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/102,557

(22) Filed: Jun. 23, 1998

(30) Foreign Application Priority Data

Jul. 1, 1997 (JP) .................................. 9-175775
Jul. 9, 1997 (JP) .................................. 9-183385

(51) Int. Cl.[7] .................................................. F16D 41/06
(52) U.S. Cl. .......................................... 192/45; 192/110 B
(58) Field of Search ............................. 192/45, 45.2, 44, 192/110 B, 45.1

(56) References Cited

U.S. PATENT DOCUMENTS

| 1,288,327 | * | 12/1918 | Westrich | 192/44 |
| 3,017,002 | * | 1/1962 | Marland | 192/45 |
| 3,380,563 | * | 4/1968 | Bowers et al. | 192/45 |
| 3,388,779 | * | 6/1968 | Roper | 192/44 |
| 3,476,226 | * | 11/1969 | Massey | 192/44 |
| 3,481,436 | * | 12/1969 | Wilkowski | 192/44 |
| 4,083,419 | * | 4/1978 | Fogelberg | 192/45 X |
| 4,476,744 | * | 10/1984 | Crooks | 192/12 B X |
| 5,048,651 | | 9/1991 | Lederman . | |
| 5,407,045 | * | 4/1995 | Welter et al. | 192/45.1 |
| 5,477,951 | * | 12/1995 | Itoh et al. | 192/45.1 |
| 5,482,150 | | 1/1996 | Stark . | |
| 5,518,093 | * | 5/1996 | Hartig et al. | 192/45 |
| 5,547,060 | * | 8/1996 | Giese | 192/110 B |
| 5,595,272 | * | 1/1997 | Zhou | 192/45 |
| 5,617,937 | | 4/1997 | Zettner et al. . | |
| 5,672,110 | * | 9/1997 | Kurita et al. | 192/45 X |
| 5,675,202 | * | 10/1997 | Zenmei et al. | 192/45 X |
| 5,704,458 | | 1/1998 | Neuwirth et al. . | |

FOREIGN PATENT DOCUMENTS

| 1182378 | 2/1970 | (GB) . |
| 1198504 | 7/1970 | (GB) . |
| 2078316 | 1/1982 | (GB) . |
| 6-63942 | 9/1994 | (JP) . |
| 7-317807 | 12/1995 | (JP) . |

* cited by examiner

Primary Examiner—Richard M. Lorence
Assistant Examiner—Ha Ho
(74) Attorney, Agent, or Firm—Jacobson, Price, Holman & Stern, PLLC (57) ABSTRACT A pulley unit A includes two, inner and outer ring bodies 1, 2 disposed concentrically, a one-way clutch 3 interposed in an annular space between both ring bodies 1,2, and rolling bearings provided on both sides of the one-way clutch 3 in the annular space, wherein a recessed part 10b provided on a member 10 where a cam face 10a for forming a wedge space for storing a roller 13 of the one-way clutch 3 is formed and a projecting part 12c provided on the axial one end of a cage 12 of the one-way clutch 3 are fitted to each other in the axial direction to prohibit the circumferential movement of the cage 12, and the projecting part 12c is physically checked from slipping off the recessed part 10b to prohibit the axial movement of the cage 12.

8 Claims, 6 Drawing Sheets

PULLEY UNIT

BACKGROUND OF THE INVENTION

1. Field of the Invention

This invention relates to a pulley unit provided with a one-way clutch. This pulley unit can be installed on an auxiliary machine driven from a crankshaft of an engine of an automobile or the like through a belt. As an auxiliary machine, cited are a compressor for an air conditioner, a water pump, an alternator, a cooling fan and so on of an automobile or the like.

2. Description of the Related Art

Various auxiliary machines installed on an automobile engine are driven through abelt by a crankshaft of the engine. Especially in thecase of an alternator among the auxiliary machines, if it is connected in such a manner as to be rotated synchronously with the crankshaft of the engine, when the rotating speed of the crankshaft drops, the power generation capability is lowered.

The applicant of the present invention has considered that the above one-way clutch is built in an alternator, whereby when the rotating speed of a crankshaft drops, the rotation of a rotor of the alternator is continued by its inertia force to heighten the power generation efficiency.

In this case, the one-way clutch is interposed between a pulley of the alternator and the rotor, and according to a rotational difference between the pulley and the rotor, the one-way clutch is switched between the free state (power transmission state) and the lock state (power transmission interruption state) to transmit or cut off power between the pulley and the rotor.

In the described one-way clutch, originally, it is necessary to detent a cage to a member where a cam face is formed for conducting the lock operation and the free operation. As a detent measure for the cage, the applicant of the present invention has considered the construction shown in the specification attached to Japan Utility Model Application No. 5-5162. That is, recessed cam faces formed in several areas of the circumference of an outer ring are extended to one axial end, and projecting parts engaged with the recessed cam faces are provided in the several areas of the circumference of the outer peripheral surface at one axial end of the case, whereby the cage is detented to the outer ring by the circumferential engagement of the projecting parts with the recessed cam faces.

As the conventional one-way clutch is so constructed that the existing recessed cam faces formed on the outer ring are applied to detent the cage, the following disadvantages are caused.

In the first place, the sectional form of the existing recessed cam face does not have a fixed radius of curvature unlike a circular arc. It is considered to be wasteful in respect of cost to work the sectional form of the projecting part corresponding to the recessed cam face with high accuracy only for detent for the cage, so conventionally the projecting part is set to be simply fitted in the recessed cam face. In such a structure, during the lock and free operation of the one-way clutch, the case is liable to be shaken due to the reaction force of an elastic member for energizing a roller, so that the responsiveness at the time of lock and free operation becomes bad and what is worse, there is the possibility that the complete lock state can not be attained. In situations where with the rotating operation of the outer ring body and the inner ring body, vibration is continuously caused, it is pointed out that the cage is sometimes displaced in the axial direction so that the roller is liable to skew and the lock and free operation becomes unstable.

SUMMARY OF THE INVENTION

It is, accordingly, an object of the invention to stabilize the operation by making a cage of a one-way clutch in the circumferential direction and in the axial direction in a pulley unit having a one-way clutch.

A first pulley unit of the present invention comprises two, inner and outer ring bodies disposed concentrically, a one-way clutch interposed in an annular space between both ring bodies, and rolling bearings provided on both sides of the one-way clutch in the annular space, wherein a recessed part opened toward the shaft end is provided on one axial end face of a member where a cam face for forming a wedge space where a roller of the one-way clutch is accommodated is formed, a projecting part fitted to the recessed part from the axial direction is provided on one axial end of a cage of the one-way clutch, and a stop member for the projecting part is disposed on the opening side of the recessed part.

A second pulley unit of the present invention comprises two, inner and outer ring bodies disposed concentrically, a one-way clutch interposed in an annular space between both ring bodies, and rolling bearings provided on both sides of the one-way clutch in the annular space, wherein the one-way clutch includes inner and outer rings, a roller and a cage, a recessed part opened to the shaft end is provided on one axial end face on the sides of inner and outer rings where a cam face for forming a wedge space is formed, a projecting part fitted to the recessed part from the axial direction is provided on one axial end of the cage, and a stop member for the projecting part is disposed on the opening side of the recessed part.

A third pulley unit of the present invention comprises an outer ring body driven in rotation by a belt, an inner ring body disposed in the inner periphery of the outer ring body, a one-way clutch interposed in an annular space between both ring bodies and rolling bearings provided on both sides of the one-way clutch in the annular space, wherein the one-way clutch includes a plurality of rollers, a cage having a pocket for accommodating plural rollers, an outer ring disposed on the outer periphery of the cage, an inner ring provided with a cam face for forming a wedge space in a position corresponding to the pocket of the cage, and an elastic member for pressing the rollers to the narrow side of the wedge space, a recessed part opened to the shaft end is provided on one axial end face of the inner ring, a projecting part fitted to the recessed part from the axial direction is provided on the inner peripheral side of one axial end of the cage, and a stop member for the projecting part is disposed on the opening side of the recessed part.

BRIEF DESCRIPTION OF THE DRAWINGS

These and other objects as well as advantages of the invention will become clear by the following description of preferred embodiments of the invention with reference to the accompanying drawings, wherein.

In all these figures, like components are indicated by the same numerals.

DETAILED DESCRIPTION OF THE INVENTION

The preferred embodiments of the present invention will now be described with reference to the attached drawings. (First preferred embodiment of the present invention)

First, a pulley unit according to the first preferred embodiment of the present invention will now be described with reference to FIG. 1 to FIG. 4.

Figure 1:
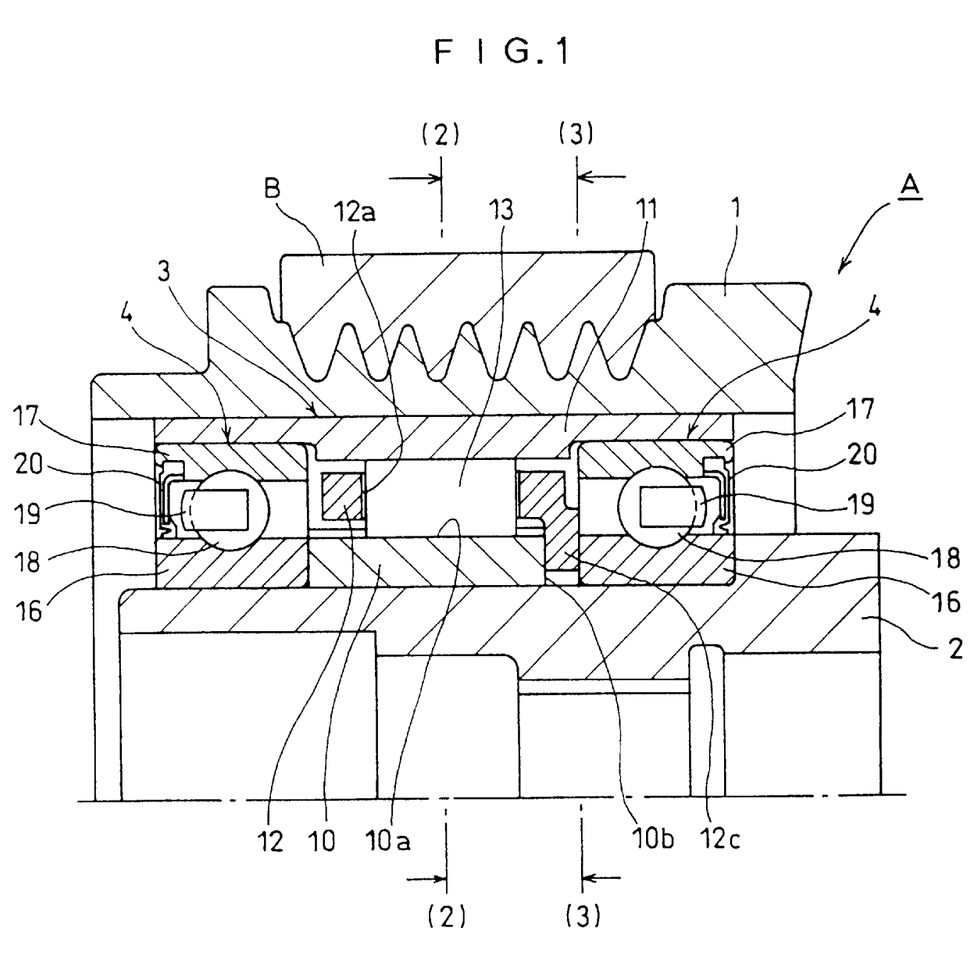
FIG. 1 is a longitudinal section of a pulley unit according to a first embodiment of the present invention.

The illustrated pulley unit A comprises two, inner and outer ring bodies 1, 2 disposed concentrically, a one-way clutch 3 interposed in an annular space between both ring bodies 1, 2, and two rolling bearings 4, 4 disposed on both sides in the axial direction of the one-way clutch 3 in the annular space.

A groove where a wavy belt B is wrapped is formed on the outer periphery of the outer ring body 1. The outer ring body 1 is driven in rotation through a belt B called V-belt by a crankshaft of an automobile engine or the like. The inner ring body 2 is formed by a sleeve-like member, which is fixed to an input shaft (e.g. a rotor of an alternator) of an auxiliary machine of an automobile, not shown.

Figure 2:
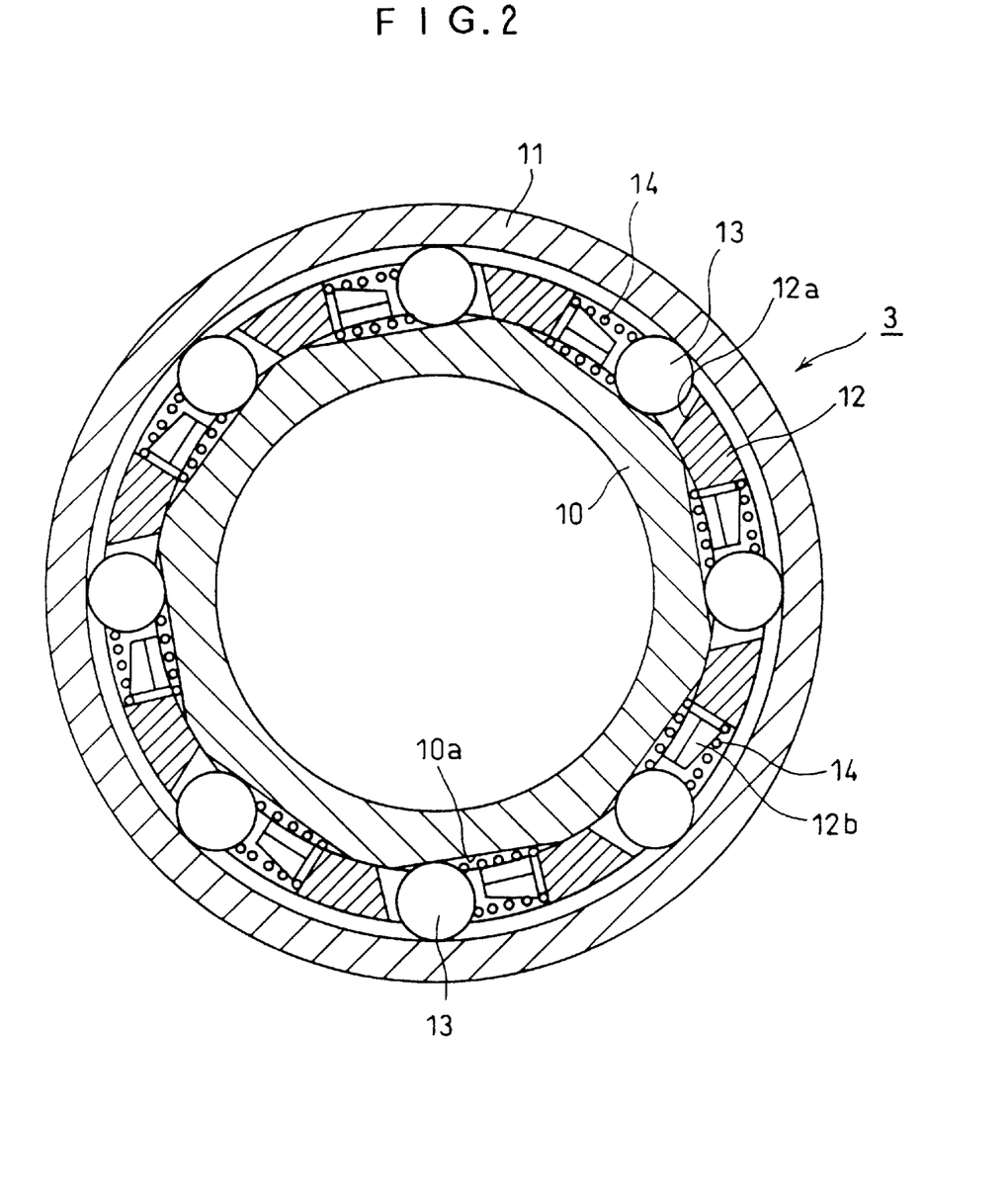
FIG. 2 is a fragmentary view taken in the direction of the arrows along a line (2)—(2) of FIG. 1.
Figure 4:
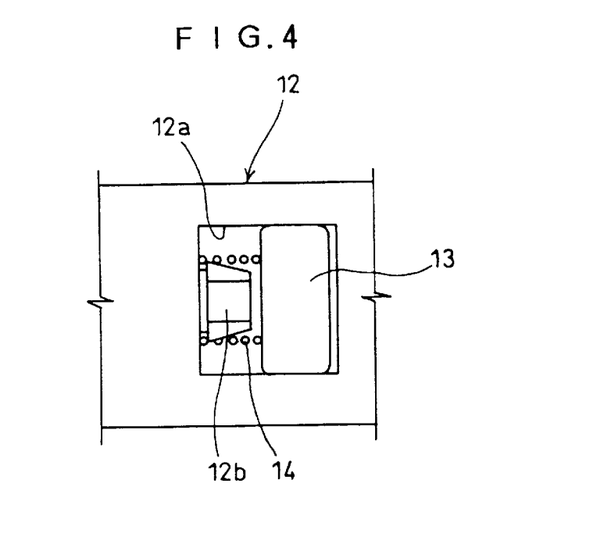
FIG. 4 is a development showing a part of a one-way clutch.

The one-way clutch 3 comprises an inner ring 10 having flat key-like cam faces 10a provided in several areas of the circumference of the outer peripheral surface, an outer ring 11 formed to be elongated in the axial direction in such a manner that the rolling bearings 4, 4 are internally fitted to both ends, a cage 12 having a pocket 12a formed to be pierced inside and outside in the radial direction corresponding to the cam face 10a, a plurality of rollers 13 accommodated one by one in each pocket 12a of the cage 12, and coil springs 14 having a substantially rectangular section as an elastic member which are accommodated one by one in each pocket 12a of the cage 12 and adapted to press the roller 13 to the narrow side (lock side) of a wedge space between the cam face 10a and the inner peripheral surface of the outer ring 11. On the inner wall surface of the pocket 12a of the cage 12, as shown in FIG. 2 and FIG. 4, a projection 12b contracted at the root is integrally formed, one axial end of the coil spring 14 is locked and fitted to the contracted part of the root of the projection 12b, and the inner periphery of the coil spring 14 is received by the outer periphery of the projection 12b to prevent distortion when the coil spring 14 is compressed. Further, as shown in FIG. 4, a taper surface for facilitating installation of the coil spring 14 is provided on the outside cylindrical surface of the tip of the projection 12b.

Both of two rolling bearings 4, 4 are formed by a general deep groove ball bearing having an inner ring 16, an outer ring 17, plural balls 18 and a cage 19, and an oil seal 20 as a sealing member is installed only on the axial outer end side between the inner and outer rings 16, 17. That is, the one-way clutch 3 is sealed by two rolling bearings 4, 4, and two rolling bearings 4, 4 and the one-way clutch 3 are lubricated by a common lubricant. Thus, the need of partition construction is eliminated as compared with the case of using the respective lubricants, and also one work operation of injecting a lubricant is sufficient so as to avoid waste.

The operation of the thus constructed pulley unit A will be described. To be short, when the rotating speed of the outer ring body 1 is Increased relatively more than that of the inner ring body 2, the roller 13 of the one-way clutch 3 is rolled to the narrow side of the wedge space to be put in the lock state, so that the outer ring body 1 and the inner ring body 2 are integrated and rotated synchronously with each other. However, if the rotating speed of the outer ring body 1 is decreased relatively more than that of the inner ring body 2, the roller 13 of the one-way clutch 3 is rolled to the wide side of the wedge space to be put in the free state, whereby the transmission of rotating power from the outer ring body 1 to the inner ring body 2 is interrupted so that the inner ring body 2 is continuously rotated only by the rotating inertia force.

If the pulley unit A is used in an alternator, regardless of the rotation variation of a crankshaft of an engine as a driving source for a belt B, the rotation of the rotor of the alternator is maintained in a high region to heighten the power generation efficiency. That is, when the rotating speed of the crankshaft is increased, the one-way clutch 3 is put in the lock state to rotate the inner ring body 2 synchronously with the outer ring body 1, and on the contrary, when the rotating speed of the crankshaft is reduced, the one-way clutch 3 is put in the free state so that the inner ring body 2 may be continuously rotated by its rotating inertia force independently of deceleration of the outer ring body 1.

Figure 3:
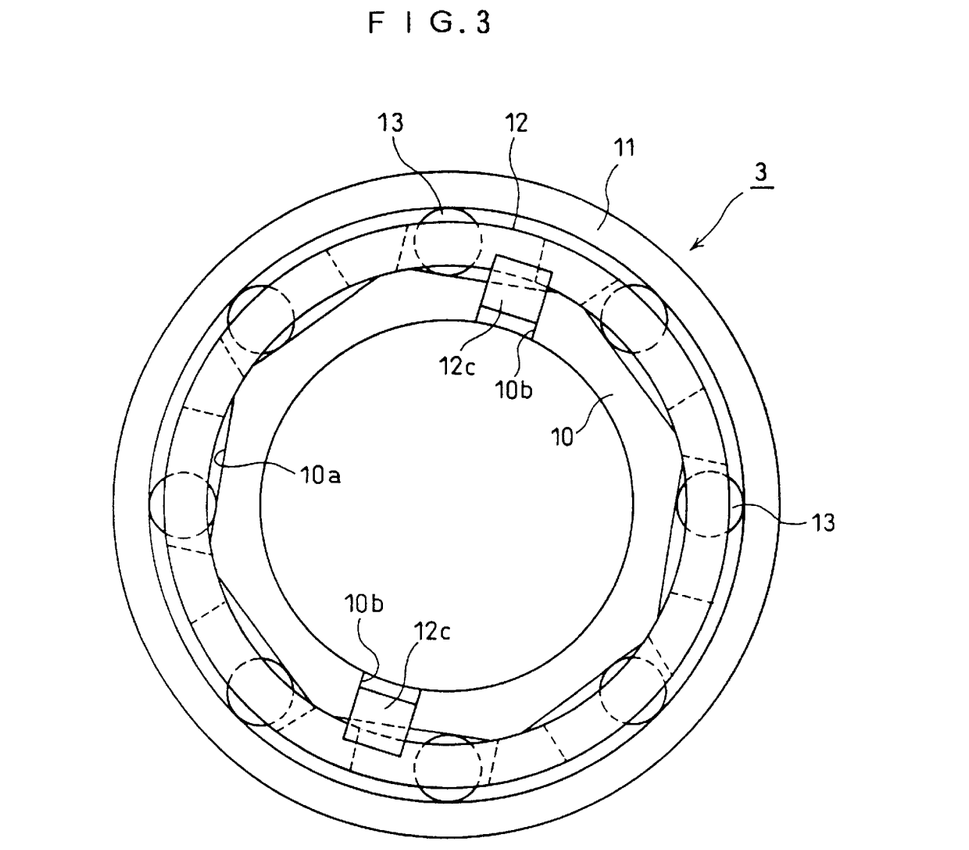
FIG. 3 is a fragmentary view taken in the direction of the arrows along a line (3)—(3) of FIG. 1.

The characteristic construction of the described pulley unit A will now be described. The characteristic construction is mainly that in which the cage 12 of the one-way clutch 3 is inmovable in the circumferential direction and in the axial direction. To be concrete, one axial end face of the inner ring 10 of the one-way clutch 3 is provided with a slit-like recessed part 10b which is opened to the shaft end and opened inside and outside in the radial direction, further the inner peripheral side of one axial end of the cage 12 is provided with a projecting part 12c press-fitted in the recessed part 10b from the axial direction, and the circumferential movement of the cage 12 is prohibited by press-fitting of the recessed part 10b and the projecting part 12c. Further, the projecting part 12c is clamped in the axial direction between the inner wall surface of the recessed part 10b and the end face of the inner ring 16 of one rolling bearing 4 disposed on the opening side of the recessed part 10b, thereby prohibiting the axial movement of the cage 12.

The recessed part 10b and the projecting part 12c are provided in two places opposite to each other through 180 degrees in this embodiment. The number may be at least one place or two or more places. If the number is decreased, it is advantageous in that it is not necessary to control the working accuracy not so severely.

If the circumferential and axial movement of the cage 12 of the one-way clutch 3 is thus prohibited, the lock and free operation of the one-way clutch 3 can be conducted stably. That is, if the cage 12 is immovable in the circumferential direction, the reaction force of the resilient energizing force of the roller 13 by the coil spring 14 can be strongly caught, so that the lock operation of the roller 13 can be supported efficiently. On the other hand, if the cage 12 is immovable in the axial direction, even in the situations where vibration and shock are applied from the belt B, the roller 13 is hard to skew. Thus, the lock and free operation of the roller 13 can be stably performed.

Further, since in the first embodiment, originally the separation between the recessed part 10b and the projecting part 12c is checked by one rolling bearing 14 provided on the side of the one-way clutch 3, the need of specially using a stop member such as a snap ring or the like can be eliminated to contribute to the reduction in the number of parts and cost.

Further, as the cam face 10a of the one-way clutch 3 is provided on the inner ring 10 in the first embodiment, the roller 13 can be prevented from unnecessarily dislocating from the lock position by centrifugal force even in the high speed rotating range. Accordingly, the operational stabilization of the roller 13 can be further heightened by multiplication of the above effect and the effect produced by the movement constraint of the cage 12 so as to contribute to an improvement in reliability.

Figure 5:
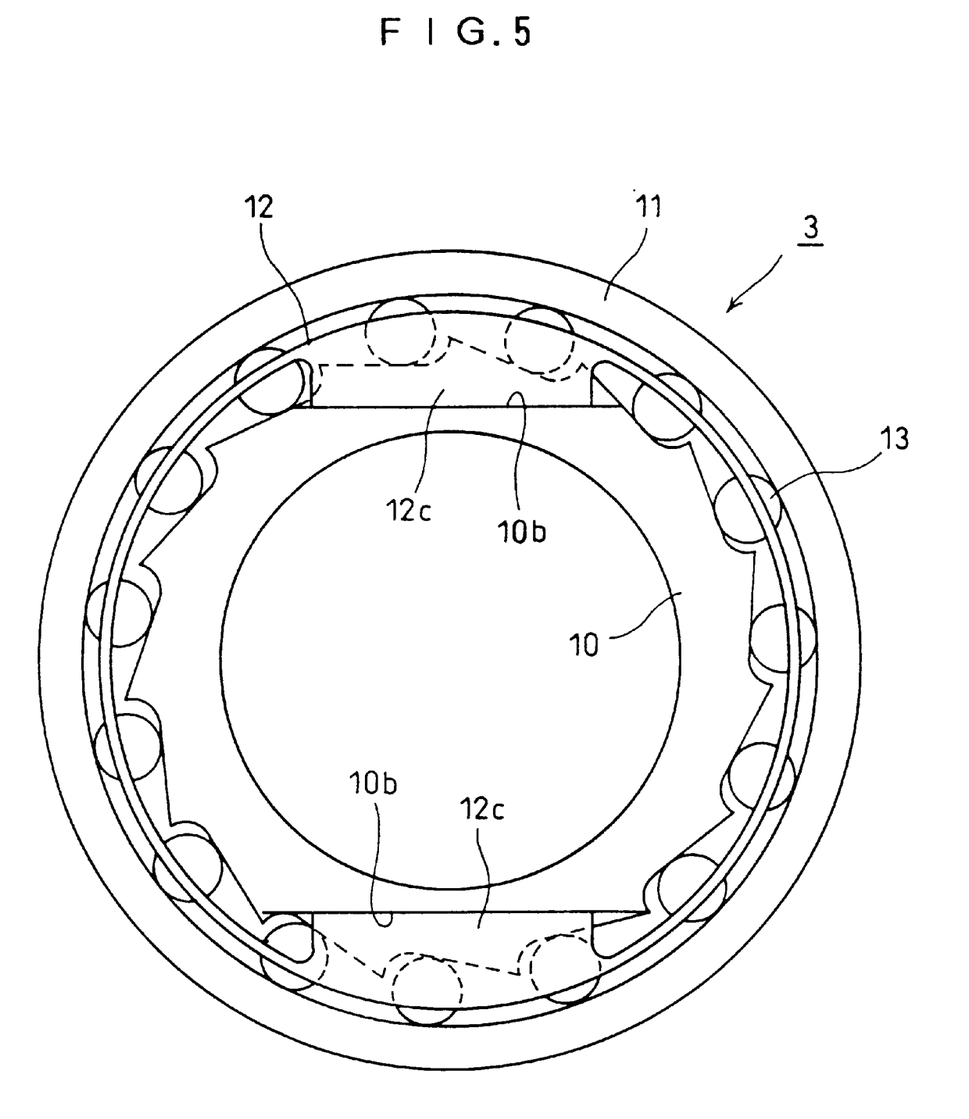
FIG. 5 is a view similar to that of FIG. 3 and illustrates a modified form of the first embodiment according to the present invention.

Though one axial end face of the inner ring 10 of the one-way clutch 3 is provided with a slit-like recessed part 10b extended inside and outside in the radial direction in the first embodiment described above, as shown in FIG. 5, the recessed part 10b can be formed like a flat key. In FIG. 5, in order to increase the number of rollers 13 used, the circumferential width of the cam face 10a of the inner ring 10 of the one-way clutch 3 is reduced, and the cam face 10a is a form containing a curve. The part containing a curve is a free rotating position of the roller 13.

Though the coil spring 14 is taken as an example for an elastic member of the one-way clutch 3 in the first embodiment described above, it can be replaced by various plate springs and elastic pieces.

Further, though the first embodiment described above deals with the case where the cam face 10a of the one-way clutch 3 is formed on the inner ring side, the present invention can be applied to the case where it is formed on the outer ring side. In the case of the above embodiment, the roller can be prevented from unnecessarily being dislocated from the lock position by centrifugal force even in the high speed rotation range, so it is suitable for use in high speed rotation. (Second preferred embodiment of the present invention)

Figure 6:
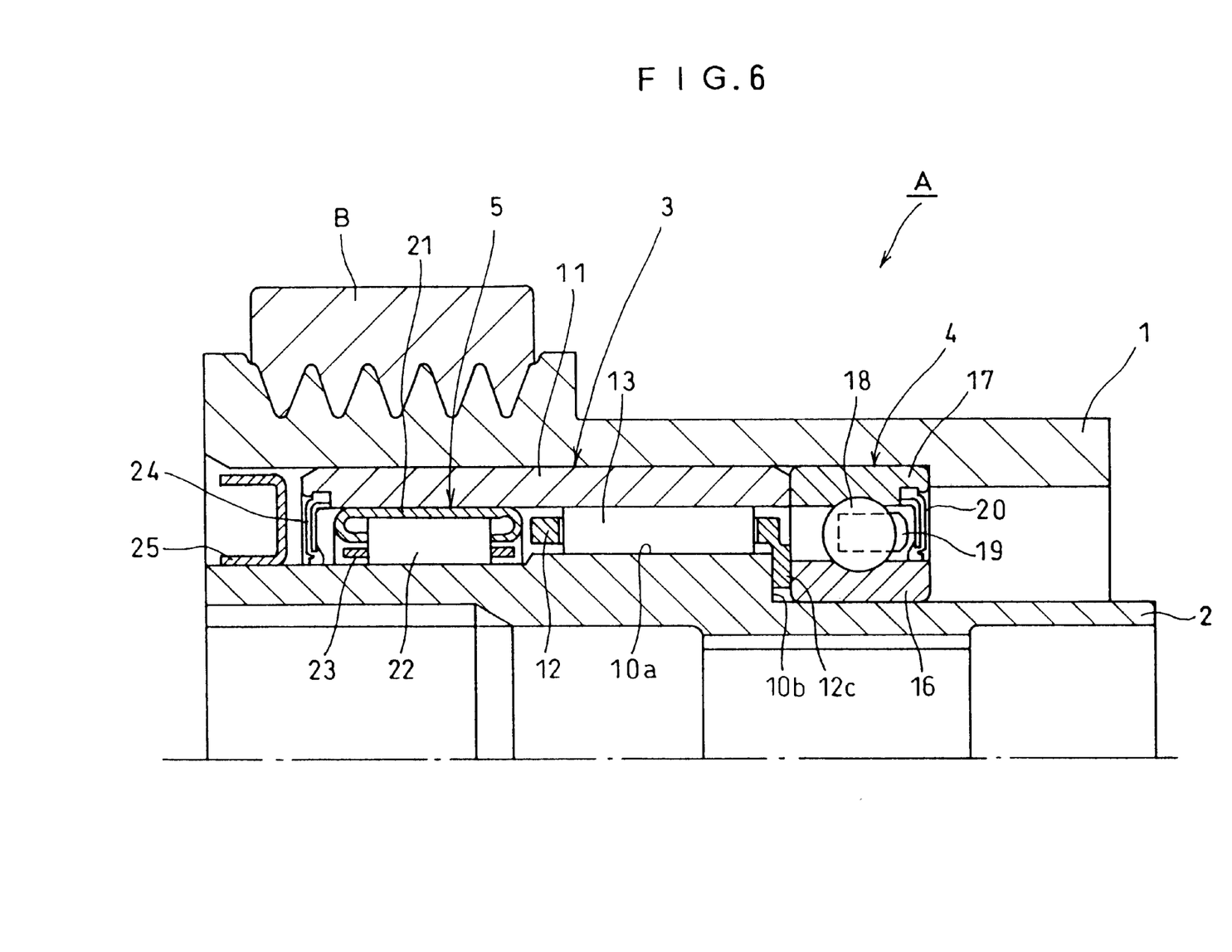
FIG. 6 is a longitudinal section of a pulley unit according to a second embodiment of the present invention.

First, the pulley unit according to the second preferred emodiment of the present invention will be described with reference to FIG. 6. In the second embodiment, the structure is suitable for the configuration where a belt B is wrapped round the free end side of the pulley unit A.

That is, the differences in the second embodiment from the first embodiment described above are that a wavy belt wrapping groove is formed mainly in a position biased to one axial end in the outer periphery of the outer ring body 1, and that among two rolling bearings 4, 5 disposed on both sides in the axial direction of the one-way clutch 3, the rolling bearing 5 nearer to the above belt wrapping groove is a needle roller bearing, and the other rolling bearing 4 is a deep groove ball bearing. The needle roller bearing 5 is a general structure comprising a shell outer ring 21, plural needle rollers 22 and a cage 23.

In the second embodiment, the inner ring of the one-way clutch 3 is integrally formed on the inner ring body 2, and the inner ring body 2 is provided with a cam face 10a and a recessed part 10b to which a projecting part 12c of the cage 12 is fitted from the axial direction.

In the outer rind of the one-way clutch 3, on the arrangement side shaft end of the needle roller bearing 5, an oil seal 24 is installed in contact with the outer peripheral surface of the inner ring body 2, and further in the inner ring body 2, on the belt B arrangement side, a seal ring body 25 is installed opposite to the inner peripheral surface of the outer ring body 1 through a very small clearance. By the oil seal 24, the seal ring body 25, and an oil seal 20 of the deep groove ball bearing 4, three of the one-way clutch 3, the deep groove ball bearing 4 and the needle roller bearing 5 are sealed, and both bearings 4, 5 and the one-way clutch 3 are lubricated by a common lubricant.

As described above, in the second embodiment of the pulley unit A, in consideration of the circumstances where load of the belt B is biased to the free end side of the inner ring body 2, concerning the roller bearings on both sides of the one-way clutch 3, the needle roller bearing 5 having a comparatively large load carrying capacity is disposed on the free end side of the inner ring body 2, and a deep groove ball bearing 4 having a comparatively small load carrying capacity is disposed on the base end side. Accordingly, even if the load of the belt B is applied as offset load, as the withstand load capacity of the above needle roller bearing 5 is large, early breakage as before is not caused, and also deflection of the outer ring body 1 and the inner ring body 2 can be restrained so that the force for causing the roller 13 of the one-way clutch 3 to skew is hardly produced to contribute to the stabilization of lock and free operation of the roller 13. Further, since the deep groove ball bearing 4 capable of receiving thrust load is disposed on the base end side of the inner ring body 2, even in the situations where vibration is continuously applied, similarly to the prior art, the axial displacement of the one-way clutch 3 can be prevented. Thus, a contribution to the improvement in life of the pulley unit A can be made, and also the operation of the one-way clutch 3 can be stabilized to heighten the power transmission efficiency between the inner ring body 2 and the outer ring body 1, thereby contributing to an improvement in reliability.

Further, since the one-way clutch 3 and one side needle roller bearing 5 are , so to speak, integrally constructed in the second embodiment described above, handling and assembling work efficiency can be improved so as to contribute to an improvement in productivity.

Figure 7:
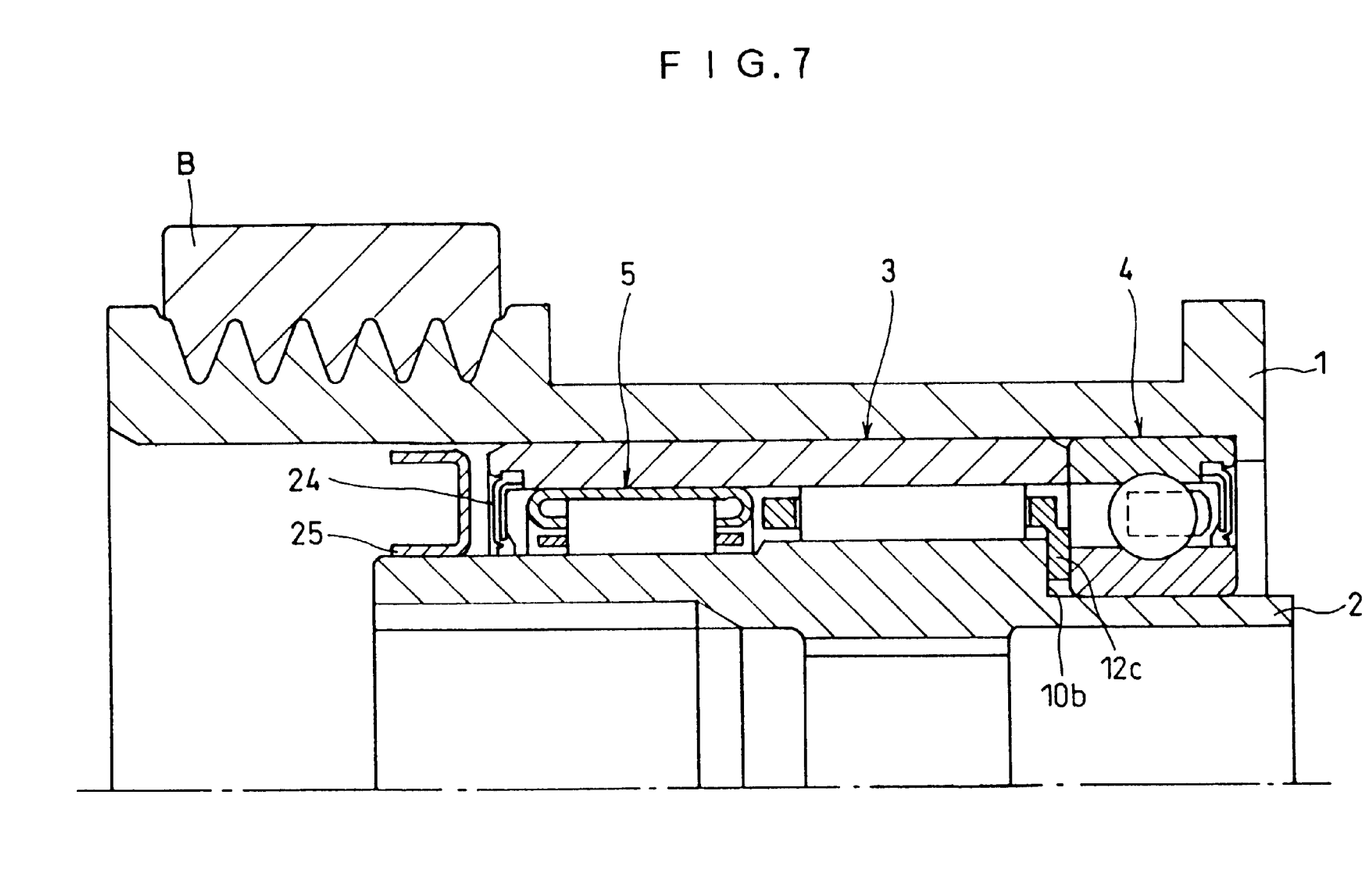
FIG. 7 is a view similar to that of FIG. 6 and illustrates a modified form of the second embodiment according to the present invention.

Though the outer ring body 1 and the inner ring body 2 are of the substantially same length in the second emodiment described above, as shown in FIG. 7, the outer ring body 1 can be made longer than the inner ring body 2. Though the one-way clutch 3 and the roller bearings 4, 5 on both sides thereof are arranged in such a manner as to be biased to the base end side of the inner ring body 2 from the belt B wrapping area in the outer ring body 1 in this embodiment so that excessive load is applied to the needle roller bearing 5 on the belt B side similarly to the above embodiment, the needle roller bearing can be prevented from being broken early because it has a large load carrying capacity.

Though the needle roller bearing 5 is internally installed in the inner periphery of the outer ring 11 of the one-way clutch 3 in the second embodiment, the needle roller bearing 5 may be interposed between the outer ring body 1 and the inner ring body 2.

Further, the detailed constitution of the one-way clutch 3 is not especially limited in the second embodiment. For example, though the coil spring 14 is taken as an example for an elastic member, it can be replaced by various plate springs and elastic pieces. Further, though the embodiment deals with the case where the cam face 10a is formed on the inner ring body 2 side, the present invention can be applied to the case where it is formed on the outside diameter side. In the case of the described embodiment, the roller can be prevented from unnecessarily being dislocated from the lock position by centrifugal force even in a high speed rotation range, so it is suitable for use in high speed rotation.

While there has been described what is at present considered to be preferred embodiment of the present invention, it will be understood that various modifications may be made therein, and it is intended to cover in the appended claims all such modifications as fall within the true spirit and scope of this invention.

What is claimed is:

1. A pulley unit for use around a shaft that extends in an axial direction, the pulley unit comprising:
   a) inner and outer concentric ring bodies that define an annular space therebetween;
   b) a one-way clutch, interposed in the annular space between the inner and outer ring bodies, the one-way clutch including:
      1) a member mounted on said inner concentric ring body, said member having:
         i) an axial end face with a recessed part; and
         ii) a cam face forming a wedge space;
      2) a cage having an axial end face with a projecting part that is fit to the recessed part so as to restrain circumferential motion of the cage; and
      3) a roller and an elastic member accommodated in the wedge space, said roller locking said one way clutch when said outer concentric ring body is rotated faster than said inner concentric ring body and said roller unlocking said one way clutch and engaging said elastic member when said outer concentric ring body is rotated slower than said inner concentric ring body; and
   c) a rolling bearing provided on both sides of the one-way clutch in the annular space so as to restrain axial movement of the one-way clutch, each of said rolling bearings including an inner ring mounted on said inner concentric ring body and said projecting part of said cage being pressed between said member of said one-way clutch and said inner ring of only one of said rolling bearings.

2. The pulley unit of claim 1, further comprising:
   sealing members that are provided only on respective axial outer ends of the rolling bearings so that a single lubricant fluid space is provided for the one-way clutch and the roller bearings.

3. The pulley unit of claim 1, wherein said cam face has two ends and said cam face is continuously flat between said two ends.

4. A pulley unit for use around a shaft that extends in an axial direction the pulley unit comprising:
   a) inner and outer concentric ring bodies that define an annular space therebetween;
   b) a one-way clutch, interposed in the annular space between the inner and outer ring bodies, and including:
      1) a clutch inner ring having an axial end face with a recessed part;
      2) a clutch outer ring that, with the clutch inner ring, forms a wedge space defined by a cam face that is on one of the clutch inner ring or clutch outer ring;
      3) a roller and an elastic member contained in the wedge space, said roller locking said one way clutch when said outer concentric ring body is rotated faster than said inner concentric ring body and said roller unlocking said one way clutch and engaging said elastic member when said outer concentric ring body is rotated slower than said inner concentric ring body;
      4) a cage having an axial end face with a projecting part that is fit to the recessed part of the clutch inner ring so as to restrain circumferential motion of the cage; and
   c) a rolling bearing provided on both sides of the one-way clutch in the annular space so as to restrain axial movement of the one-way clutch, each of said rolling bearings having an inner ring mounted on said inner concentric ring body and said projecting part of said cage being pressed between said clutch inner ring and said inner ring of only one of said rolling bearings.

5. The pulley unit of claim 4, wherein said cam face has two ends and said cam face is continuously flat between said two ends.

6. A pulley unit for use around a shaft that extends in an axial direction, the pulley unit comprising:
   a) an outer ring body driven adapted to be driven by a belt;
   b) an inner ring body disposed inside the outer ring body so that the outer ring body and the inner ring body form an annular space therebetween;
   c) a one-way clutch interposed in the annular space, the one-way clutch including:
      1) a plurality of rollers;
      2) a cage having:
         i) pockets accommodating respective rollers of the plurality of rollers; and
         ii) an axial end face with a projecting part;
      3) a clutch outer ring disposed on an outer periphery of the cage;
      4) a clutch inner ring having:
         i) cam faces for forming wedge spaces in positions corresponding to respective cage pockets; and
         ii) an axial end face with a recessed part to which the cage's projecting part is fit so as to restrain circumferential motion of the cage; and
      5) an elastic member that presses the rollers to narrow sides of respective wedge spaces, said rollers locking said one way clutch when said outer ring body is rotated faster than said inner ring body and said roller unlocking said one way clutch and engaging said elastic member when said outer ring body is rotated slower than said inner ring body; and
   d) a rolling bearing provided on both sides of the one-way clutch in the annular space so as to restrain axial movement of the one-way clutch, each of said rolling bearings having an inner ring mounted on said inner concentric ring body and said projecting part of said cage being pressed between said clutch inner ring and said inner ring of only one of said rolling bearings.

7. The pulley unit of claim 6, wherein:
   the roller bearings are disposed within the clutch outer ring.

8. The pulley unit of claim 6, wherein each of said cam faces has two ends, and each of said cam faces is continuously flat between said two ends.

* * * * *